(12) United States Patent
Liu et al.

(10) Patent No.: US 9,471,771 B1
(45) Date of Patent: Oct. 18, 2016

(54) METHOD OF ENHANCED ACCOUNT AUTHENTICATION MANAGEMENT INTEGRATED WITH REAL TIME SCRIPT SHIFTING

(71) Applicant: INTERNATIONAL BUSINESS MACHINES CORPORATION, Armonk, NY (US)

(72) Inventors: Su Liu, Austin, TX (US); Prasad V Potluri, Austin, TX (US); Vi T. Tran, Austin, TX (US); Boyi Tzen, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/079,318

(22) Filed: Mar. 24, 2016

(51) Int. Cl.
*H04L 9/32* (2006.01)
*G06F 21/45* (2013.01)

(52) U.S. Cl.
CPC .................... *G06F 21/45* (2013.01)

(58) Field of Classification Search
CPC ..... G06F 21/45; G06F 21/31; H04L 63/102; H04L 63/105
See application file for complete search history.

(56) References Cited

U.S. PATENT DOCUMENTS

| 8,132,265 B2 | 3/2012 | Wootton et al. |
| 2007/0143824 A1* | 6/2007 | Shahbazi ............ H04L 63/083 726/1 |
| 2009/0241201 A1* | 9/2009 | Wootton ................ G06F 21/31 726/28 |

* cited by examiner

*Primary Examiner* — Dant Shaifer Harriman
*Assistant Examiner* — Noura Zoubair
(74) *Attorney, Agent, or Firm* — Shimokaji IP

(57) ABSTRACT

A system and method for managing a user access to a device can include detecting a first language and a second language the user uses on the device, based on information from other applications running on the device or a user profile on the device; prompting the user to setup multiple security questions using multiple languages; receiving a first question in a third language from the user, wherein the user decides the first question and the third language; receiving, a first answer to the first question from the user, wherein the first answer is provided in a fourth language chosen by the user and different from the third language; receiving a second question in a fifth language from the user, wherein the user decides the second question and the fifth language; receiving a second answer to the second question from the user, wherein the second answer is provided in a sixth language chosen by the user and different from the fifth language; and storing the first question, the second question, the first answer, and the second answer.

1 Claim, 2 Drawing Sheets

METHOD OF ENHANCED ACCOUNT AUTHENTICATION MANAGEMENT INTEGRATED WITH REAL TIME SCRIPT SHIFTING

BACKGROUND OF THE INVENTION

The present invention generally relates to authentication management. More particularly, the present invention relates to enhanced authentication management with real time script shifting.

When users forget passwords, password recovery needs to be performed efficiently and securely.

As can be seen, there is a need for enhanced account authentication management with real time script shifting.

SUMMARY OF THE INVENTION

In one aspect, a machine-implemented method for managing a user access to a device and executed on the device that causes the device to perform the method, comprises detecting, by a processor on the device, a first language and a second language (or for example, third, fourth, fifth, and sixth languages) the user uses on the device, based on information from other applications running on the device or a user profile on the device; prompting, by the processor on the device, the user to setup multiple security questions using multiple languages; receiving, by the processor on the device, a first question in a third language from the user, wherein the user decides the first question and the third language; receiving, by the processor on the device, a first answer to the first question from the user, wherein the first answer is provided in a fourth language chosen by the user and different from the third language; receiving, by the processor on the device, a second question in a fifth language from the user, wherein the user decides the second question and the fifth language; receiving, by the processor on the device, a second answer to the second question from the user, wherein the second answer is provided in a sixth language chosen by the user and different from the fifth language; and storing, in a memory on the device, the first question, the second question, the first answer, and the second answer.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a system and method for enhanced account authentication management with real time script shifting.

Figure 1:
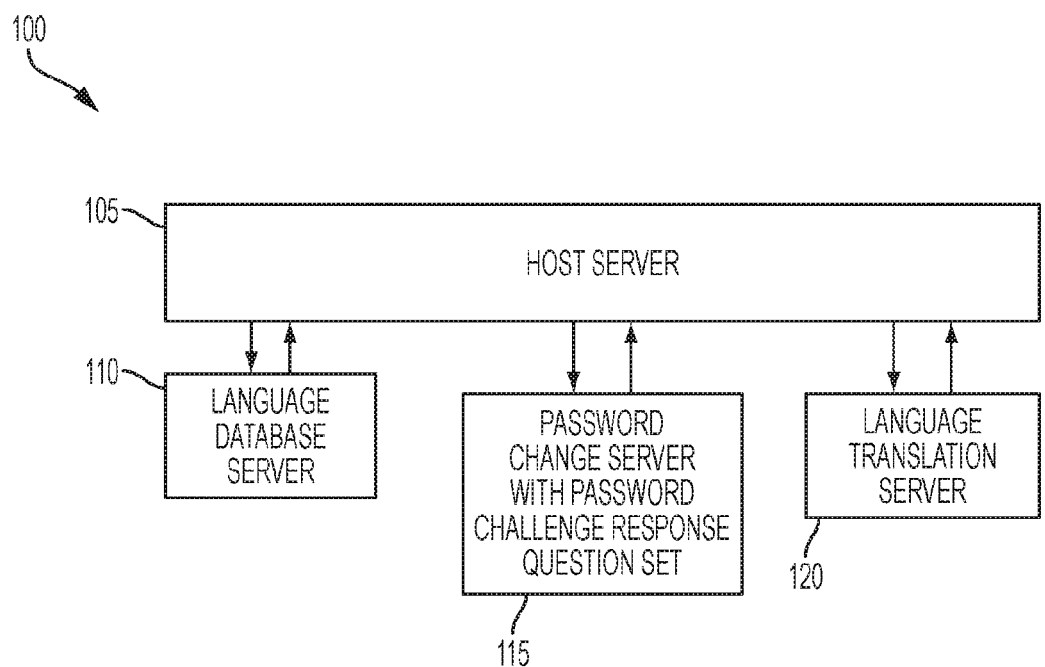
FIG. 1 illustrates a system for enhanced account authentication management.

In FIG. 1 an enhanced account authentication management system 100 is shown with a host server 105 performing controlling operations with a language database server 110, a password change server 115 with password challenge response question set (PCRQS), and a language translation server 120. The host server 100 interacts with the language translation server 120 to translate any questions in an input language and then interacts with the language database server 110 to retrieve language details for the input language. A user may input a password, or change a password to the system 100, and the host server 105 may interact with the password database and password change server to implement a password challenge response set of questions to verify the user as having access to the system 100.

Figure 2:
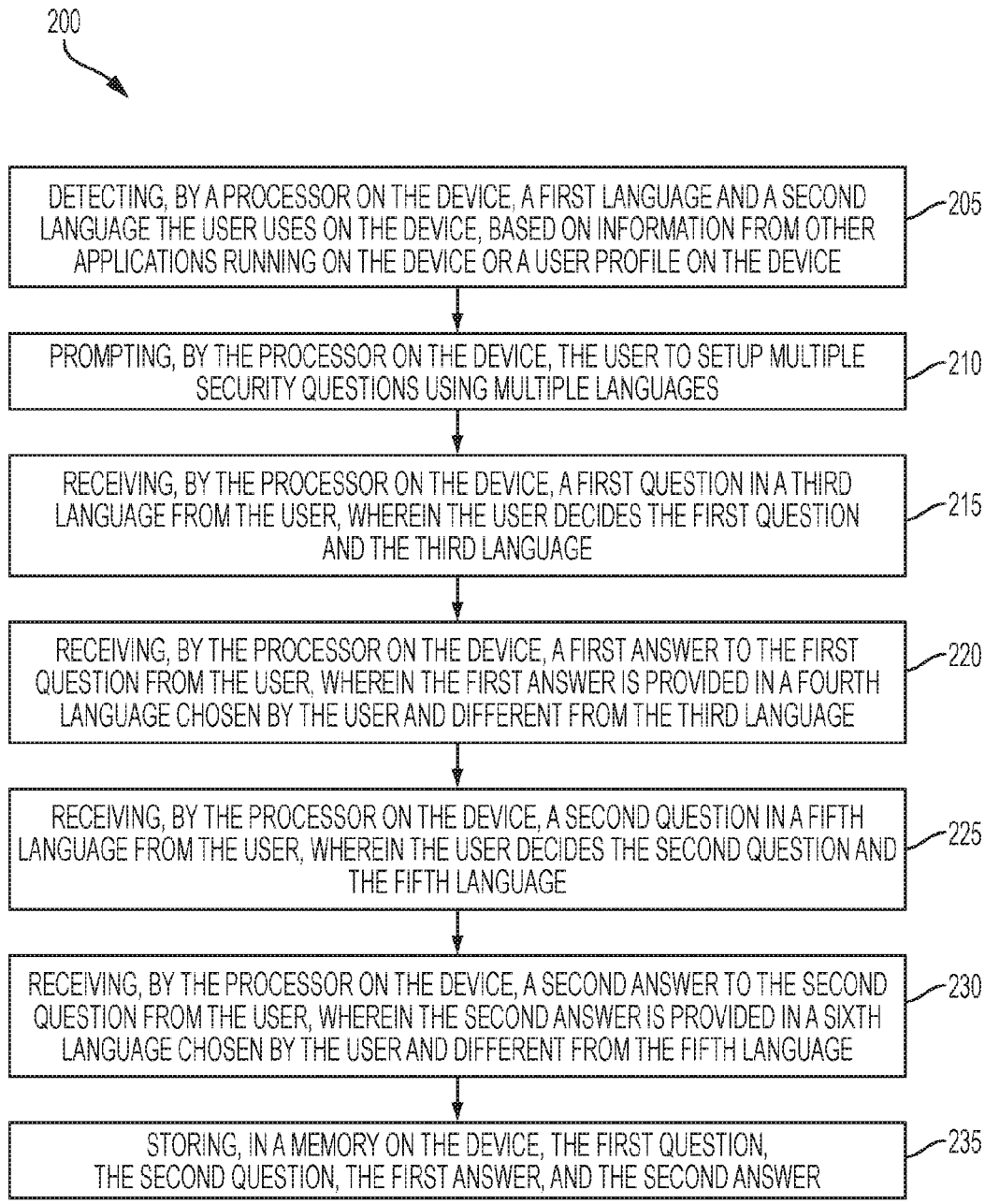
FIG. 2 illustrates a method for implementing the system of FIG. 1.

In FIG. 2 a method 200 may include a step 205 of detecting, by a processor on the device, a first language and a second language the user uses on the device, based on information from other applications running on the device or a user profile on the device. A step 210 may include prompting, by the processor on the device, the user to setup multiple security questions using multiple languages. A step 215 may include receiving, by the processor on the device, a first question in a third language from the user, wherein the user decides the first question and the third language. A step 220 may include receiving, by the processor on the device, a first answer to the first question from the user, wherein the first answer is provided in a fourth language chosen by the user and different from the third language. A step 225 may include receiving, by the processor on the device, a second question in a fifth language from the user, wherein the user decides the second question and the fifth language. A step 230 may include receiving, by the processor on the device, a second answer to the second question from the user, wherein the second answer is provided in a sixth language chosen by the user and different from the fifth language. A step 235 may include storing, in a memory on the device, the first question, the second question, the first answer, and the second answer.

In an embodiment, the system 100 and method 200 of user account authentication management may be defined for enhancing a two-factor password recovering system 100. An extra multilingual layer may be added for managing a predetermined challenge response question set (PCRQS) to protect user credential information based on user language background. The system 100 and method 200 may analyze if a user is a multilingual speaker through a multilingual awareness daemon, a supported language list, and then receive and save the user defined PCRQS and correlated answers in certain languages and scripts in the language database server 110.

In an embodiment, the user's PCRQS and answers may be managed in different languages and scripts through a multilingual PCRQS management user interface in response to user's password reset/change requests. A default language (a first language) on the PCRQS management user interface may be specified according to a user's locale setting. Then, a set of predetermined challenge response questions may be asked in a second language and script, the system 100 and method 200 may verify the user answers to the questions in a third language and script to recover users' passwords.

In an embodiment, a user may not be able to speak a second language, but may like to use the multilingual PCRQS service. A real time translation agent can be used to translate the user's PCRQS to the 2nd language, and the system 100 and method 200 may translate the user answers to the 3rd language. In addition, the key word frequency in a language, may also be used to for increasing PCRQS complexity.

In an embodiment,

PCRQS Management GUI:

A graphic user interface with multilingual features may allow users to create and reset their passwords as needed. In addition, it can allows a user to create, choose, input, editor, display, save, update, delete, PCRQS answers in the user preferred languages. This graphical user interface may be included in the password change server 115.

Multilingual Awareness Daemon:

A daemon to detect/ask if a user is a multilingual speaker or user want to use the multilingual PCRQS service, check server's language/script availability, and then encourage the user to choose one (or more) national language to create own PCRQS and answers in preferred languages. The languages on the management GUI, PCRQS, and answers could be different and configurable. This daemon may be included on the password change server 115

Supported Language List:

Account service providers can place certain languages and scripts for user selecting. In addition, the user also can add new entries with preferred languages and scripts. This user interface may be implemented on the host server 105, which then accesses the language translation server 120 and the language database server 110 for adding the user's new languages and scripts.

Multilingual PCRQS Database:

An enhanced PCRQS Database can be used to save all predefined multilingual PCRQS. And, also, the user defined new PCRQS shall be allowed to added into the Multilingual PCRQS Database. This PCRQS database can be stored on the language database server 110.

Multilingual PCRQS Answer Database:

An enhanced PCRQS answer database may be provided to hold all user's answers in different languages and scripts for user account verification service. This enhanced database may be stored on the language database server 110.

Translation Server:

A server 120 with multiple languages and script translation modules for providing translation service on the PCRQS management. The translation can either be machine translation or dictionary translation (no limit to any other translation technologies).

Multilingual PCRQS Management Agent:

Integrated agent in existing PCRQS manager, which can provide functions, such as functions to create, list, select, update, collect, and categorize multilingual PCRQS questions and answers properly. This agent may be provided on the password change server 115.

In an embodiment, a user may be a trilingual speaker. For example, User X can speak Language 1, Language 2, and Language 3. User X can set his locale as Language 1 in his mobile device, define new PCRQS questions in Language 2, and answer those PCRQS questions in Language 3. If an attacker hacked into User X's service provider's internal network, the attacker would have little chance to break the User X's credential information because of the language barriers provided by the enhanced PCRQS. Therefore, the service provider may only provide a minimum effort (only plugin multilingual PCRQS model and enable it), but an entire security complexity of the system 100 has been improved.

In an embodiment, for a monolingual speaker User Y, an option of multilingual PCRQS still can be used with an integrated real time translation service. For example, User Y may be a Language 1 speaker, and may be registered into User X's account and answered the User X's 1st PCRQS question Q1 in Language 1. And, User Y may want to display the User X's second question Q2 in a Language 4 but with Language 1 translation. User Y may put his answer A2 in Language 1 because User Y only knows Language 1. Then the system may translate User Y's answer A2 from Language 1 to Language 4 and save it to the language database server 110 system according to User Y's preference settings. In addition, User Y may request a password recovery service. After answering the first question Q1 in Language 1, User Y may get a drop-down "language selection list" in the GUI for selecting the second question Q2 in certain language. In this step, only User Y may know which language should be selected and answer it for displaying his second question Q2 (factor of "What you know"). An attacker may have problems in selecting the second language from a huge language list. If language selection is wrong, the recover session can be terminated by system 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A machine-implemented method for managing a user access to a device and executed on the device that causes the device to perform the method, comprising:

detecting, by a processor on the device, a first language and a second language a first user uses on the device, based on information from other applications running on the device or a user profile on the device;

prompting, by the processor on the device, the first user to setup multiple security questions using multiple languages;

receiving, by the processor on the device, a first question in a third language from the first user, wherein the first user decides the first question and the third language;

receiving, by the processor on the device, a first answer to the first question from the first user, wherein the first answer is provided in a fourth language chosen by the first user and different from the third language;

receiving, by the processor on the device, a second question in a fifth language from the first user, wherein the first user decides the second question and the fifth language;

receiving, by the processor on the device, a second answer to the second question from the first user, wherein the second answer is provided in a sixth language chosen by the first user and different from the fifth language; and storing, in a memory on the device, the first question, the second question, the first answer, and the second answer;

wherein, a second user is registered into the first user's account and the second user answers a first question previously decided by the first user in the first language, wherein the second user displays a second question previously decided by the first user in the fourth language, with a translation to the first language, and wherein the second user selects the language to display the second question by selecting the first, second, third, fourth, fifth or sixth language from a drop down menu for a password recovery service, wherein the password recovery service terminates if the second user selects a wrong predetermined language from the drop down menu.

\* \* \* \* \*